US005086895A

United States Patent [19]
Nemoto

[11] Patent Number: 5,086,895
[45] Date of Patent: Feb. 11, 1992

[54] BRAKE-ACTUATING MECHANISM FOR VEHICLE PARKING BRAKES

[75] Inventor: Shusuke Nemoto, Yao, Japan

[73] Assignee: Kanzaki Kokyukoki Mfg. Co., Ltd., Amagasaki, Japan

[21] Appl. No.: 593,064

[22] Filed: Oct. 5, 1990

[30] Foreign Application Priority Data

Nov. 17, 1989 [JP] Japan .............................. 1-133720[U]

[51] Int. Cl.$^5$ .............................................. B60K 41/26
[52] U.S. Cl. .................................. 192/4 A; 74/473 R
[58] Field of Search .............. 192/4 A, 4 C; 74/473 R

[56] References Cited

U.S. PATENT DOCUMENTS

| 4,666,023 | 5/1987 | Achberger et al. | 192/4 A |
| 4,709,793 | 12/1987 | Sakakibara et al. | 192/4 A |
| 4,713,983 | 12/1987 | Rundle | 74/701 |

FOREIGN PATENT DOCUMENTS 54-95676  7/1979 Japan .
58-28251  6/1983 Japan .

Primary Examiner—Allan D. Herrmann

[57] ABSTRACT

A brake-operating member (46; 46A; 81) is fixedly carried by a control shaft (36; 79) of a gear-shifting mechanism. The shaft is given, using a change lever (35), selectively one and the other of sliding and rotational movements for gear-selecting and gear-shifting purposes. The operating member is disposed such that it is displaced, when the control shaft is slidingly or rotationally moved to a position where a movable brake-actuating member (48; 79) is engaged with the control shaft through the operating member. The actuating member is moved at the operative position of operating member by the rotational or sliding movement of control shaft so as to actuate a parking brake (28; 71).

3 Claims, 5 Drawing Sheets

BRAKE-ACTUATING MECHANISM FOR VEHICLE PARKING BRAKES

FIELD OF THE INVENTION

This invention relates to an actuating mechanism for a parking brake which is employed in a vehicle, such as a tractor, for preventing the vehicle from starting when the vehicle is parked.

BACKGROUND OF THE INVENTION

Generally, a vehicle parking brake is operated so as to actuate same by a brake lever which is provided separately from a gear-shifting change lever. Contrary to this, there is disclosed in U.S. Pat. No. 4,713,983 an art which uses a gear-shifting change lever for operating a parking brake.

The parking brake disclosed in this U.S. Patent is constructed by using a speed change transmission. That is, in a tractor having a key-shift transmission in which a series of speed change gears rotatably mounted on a speed change shaft are coupled one at a time to the change shaft using shift keys which are slidably disposed within elongated grooves in the outer surface of change shaft, recesses into which gear-engaging lugs on the free ends of shift keys may project are formed in an internal journal wall of transmission casing through which the change shaft extends. When the tractor is to be parked, shift keys are slidingly displaced using a gear-shifting change lever to a position where the gear-engaging lugs project into the recesses. By this, the change shaft is locked non-rotatably through shift keys so that an unexpected start of the tractor is prevented.

The parking brake and the actuating mechanism for it disclosed in the U.S. Patent are very simple in structure because the are provided by using a gear-shift transmission. On the other hand, a shift key employed in a key-shift transmission is made of an elongated narrow plate having a small thickness so that, when it is used for locking a vehicle so as to prevent it from starting, a deformation of the key may easily be caused particularly at its gear-engaging lug due to force, which is applied when the vehicle is parked at a slope, and due to shock which is caused when the gear-engaging lug of shift key projects, with accompanying some rotation of change shaft, into a recess formed in a stationary wall. Such deformation of the shift key will prevent a smooth gear-shift operation.

Further, this prior art can be applied only to a vehicle having a key-shift transmission and cannot be applied to a vehicle having a conventional speed change transmission in which movable shifting gears or clutch members are employed for speed change purpose.

As one of the typical gear-shifting mechanisms employed in tractors and the like, there is well-known, as shown, for example, in JP, Y2 No. 58-28251 and JP, U No. 54-95676, a mechanism comprising a horizontal control shaft which is operated by a change lever selectively to rotate and to slide. The control shaft carries one or more shifter pins each of which is engaged by a rotational or sliding movement of the control shaft selectively with one of gear-shifting forks and then will cause a sliding displacement of the fork when a sliding or rotational movement is given to the control shaft.

A primary object of the present invention is to provide a novel actuating mechanism for vehicle parking brakes which is employed in a vehicle comprising a gear-shifting mechanism having the well-known structure set forth above and in which a rotatable and slidable control shaft operated by a change lever is used also as a control member for a parking brake which is provided separately from a gear-shifting transmission.

BRIEF DESCRIPTION OF THE DRAWINGS

In the accompanying drawings,

FIG. 3 is a sectional view taken along line III—III of FIG. 2;

FIG. 4 is a sectional view showing a part of a tractor in which the first embodiment is employed;

In the drawings, like reference numerals designate like parts throughout the several views thereof.

SUMMARY OF THE INVENTION

The present invention relates to a brake-actuating mechanism which is adapted for use in a vehicle including a gear-shifting mechanism and a parking brake (28; 71). The gear-shifting mechanism comprises, as shown respectively in FIGS. 1 and 2, in FIG. 6 and in FIGS. 7 and 8, a control shaft (36; 79) which is mounted for sliding movement along its longitudinal axis and for rotational movement about the axis, a change lever (35) which is operable to provide one of the sliding and rotational movements selectively to the control shaft (36; 79), and shifter forks (26, 27) each of which is supported slidably for gear-shifting operation.

Figure 1:
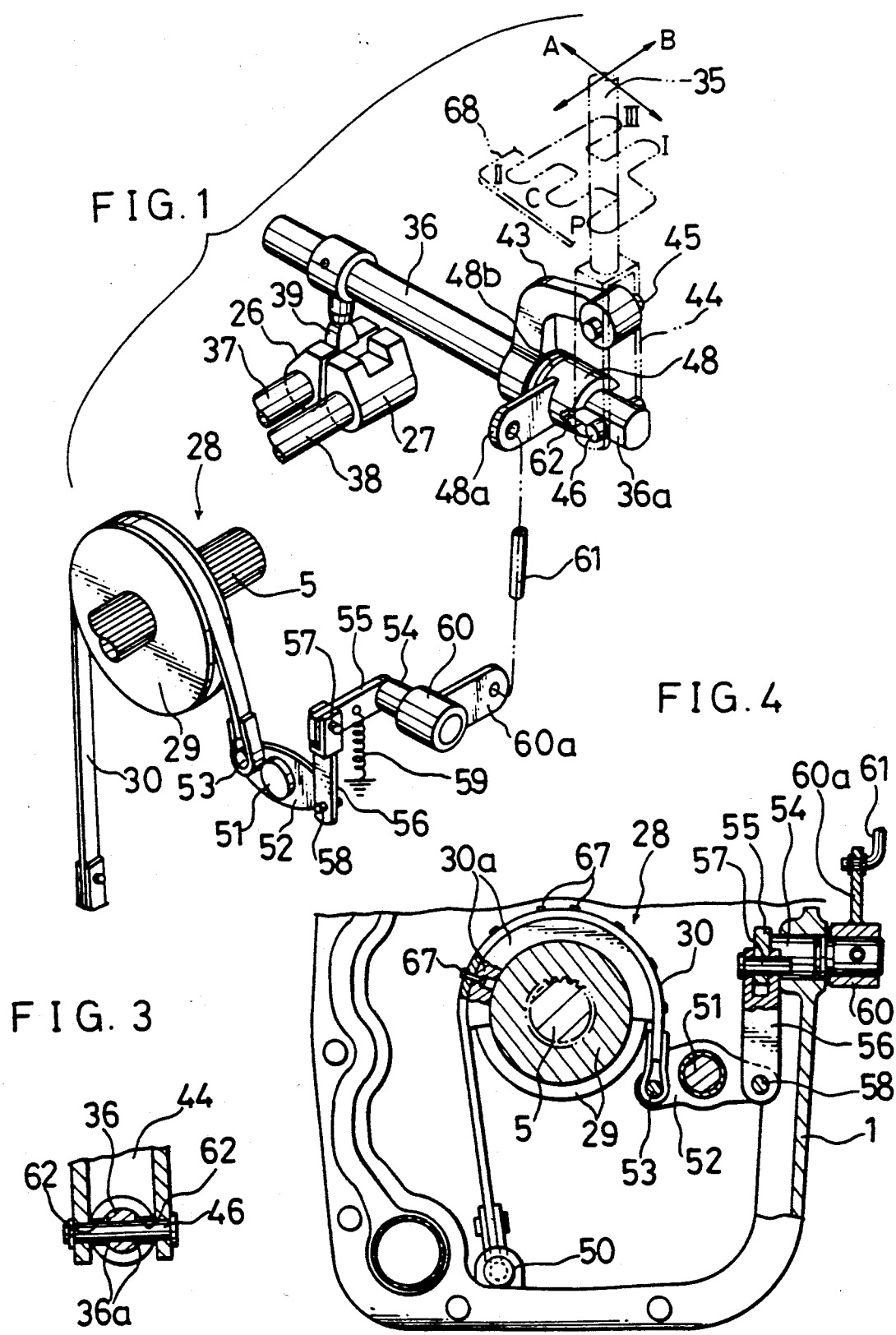
FIG. 1 is a schematic perspective view showing a first preferred embodiment of the brake-actuating mechanism according to the present invention.
Figure 2:
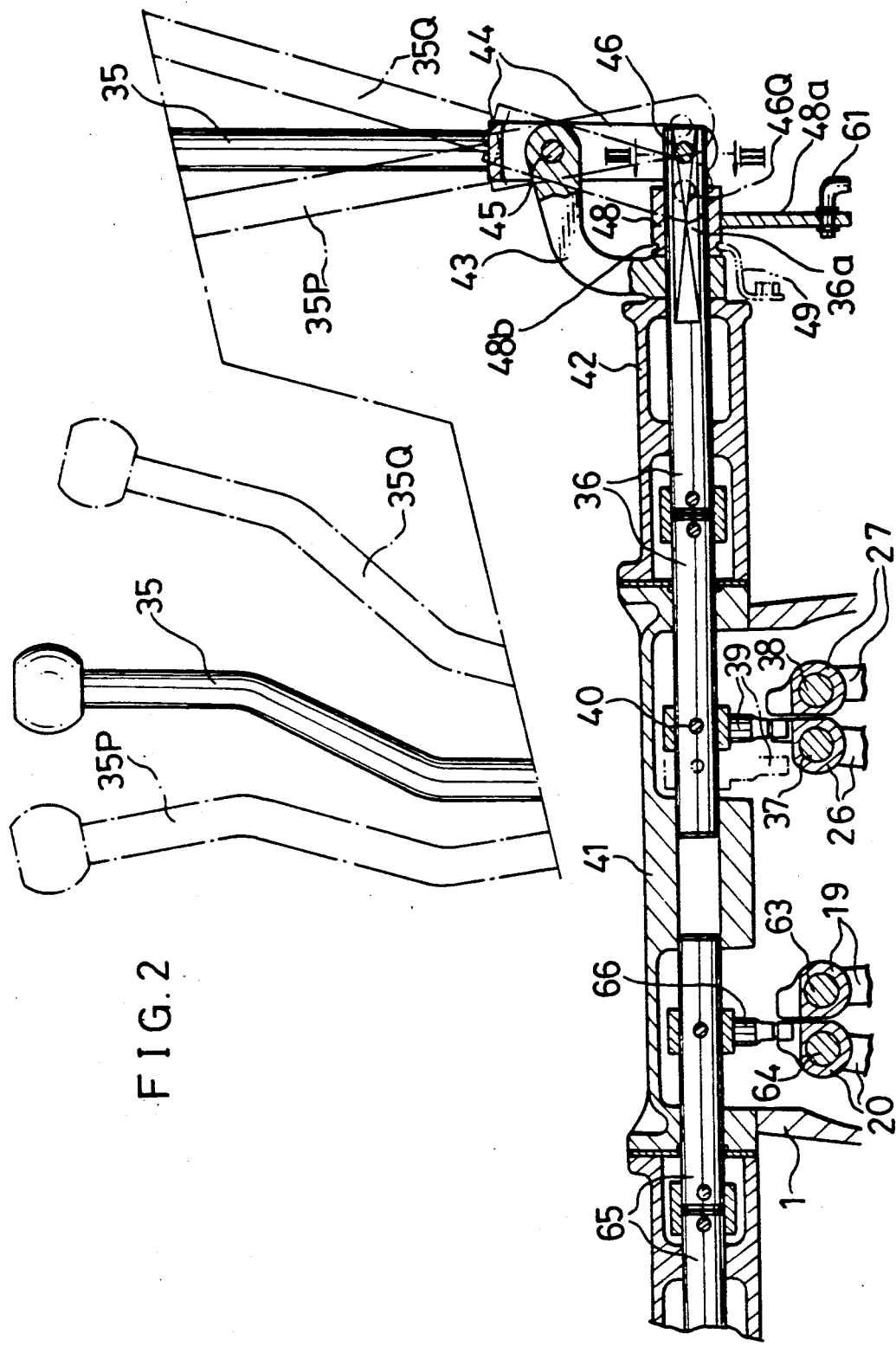
FIG. 2 is a sectional view of an essential part of the first embodiment.
Figure 6:
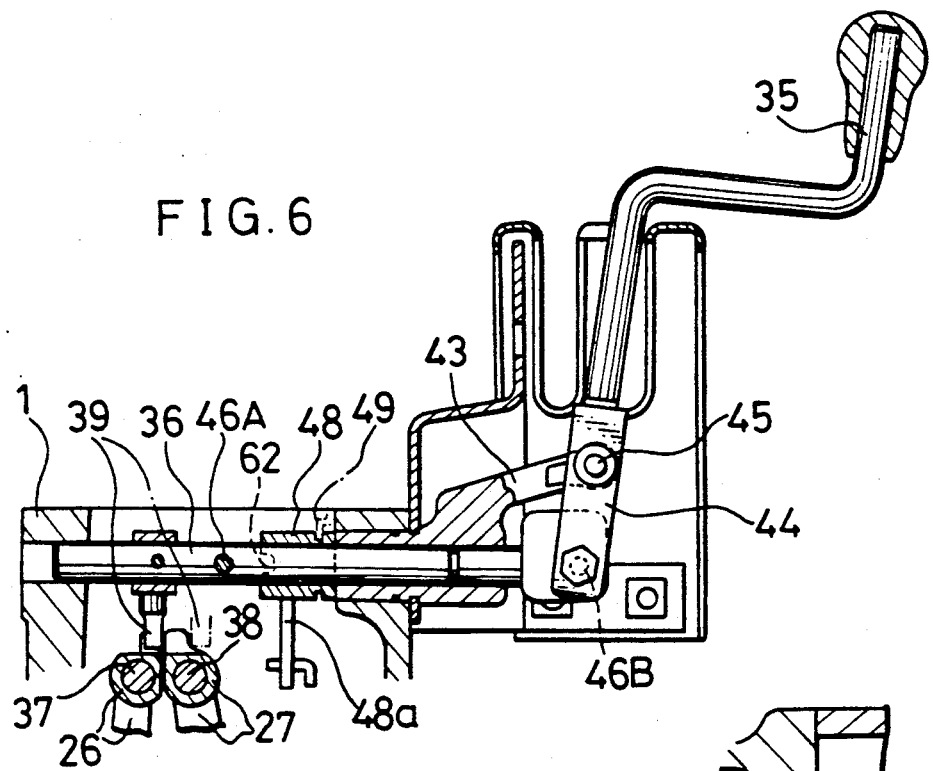
FIG. 6 is a sectional view showing a modification of the first embodiment.
Figure 8:
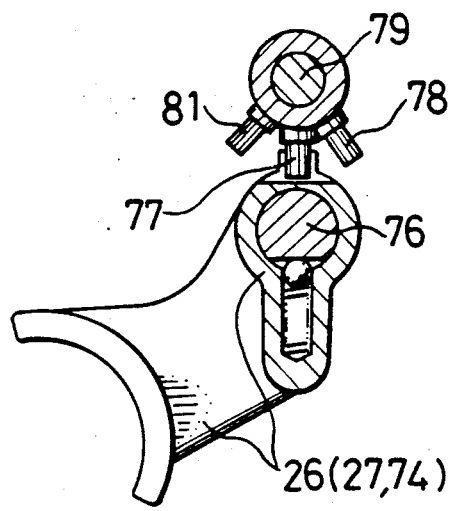
FIG. 8 is a sectional view of a part of the second embodiment.
Figure 7:
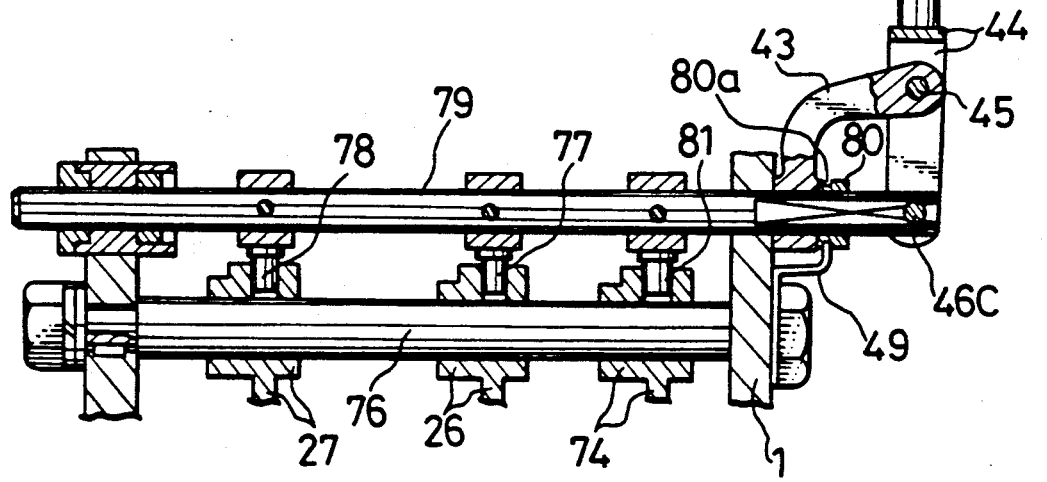
FIG. 7 is a sectional view showing an essential part of a second preferred embodiment of the mechanism according to the present invention.

As also shown respectively in FIGS. 1 and 2, in FIG. 6 and in FIGS. 7 and 8, the control shaft (36; 79) fixedly carries at least one shifter pin (39; 77, 78) through which one of the shifter forks (26, 27) is engaged selectively with the control shaft (36; 79) by a first movement of the sliding and rotational movements of the control shaft and through which each of the shifter forks (26, 27) is slidingly displaced by a second movement of the sliding and rotational movements of the control shaft (36; 79) at an engaged condition of each shifter fork with the control shaft.

The brake-actuating mechanism according to the present invention comprises, as shown respectively in FIGS. 1 and 2, in FIG. 6 and in FIGS. 7 and 8, a brake-operating member (46; 46A; 81) for operating the parking brake and a movable brake-actuating member (48; 74).

The operating member (46; 46A; 81) is fixedly carried by the control shaft (36; 79) and has an operative position to which this member is displaced selectively by the first movement of control shaft (36; 79) set forth above. The operating member (46; 46A; 81) is disposed relative to the shifter pin (36; 77, 78) such that the shifter forks (26, 27) are released from engagement with the control shaft at the operative position of the operating member.

The actuating member (48; 79) is disposed such that, when the operating member (46; 46A; 81) is displaced to its operative position, the actuating member is engaged with the control-shaft (36; 79) through the operating member so as to be moved by the second movement of control shaft, set forth above, and to thereby actuate the parking brake (28; 71).

Figure 10:
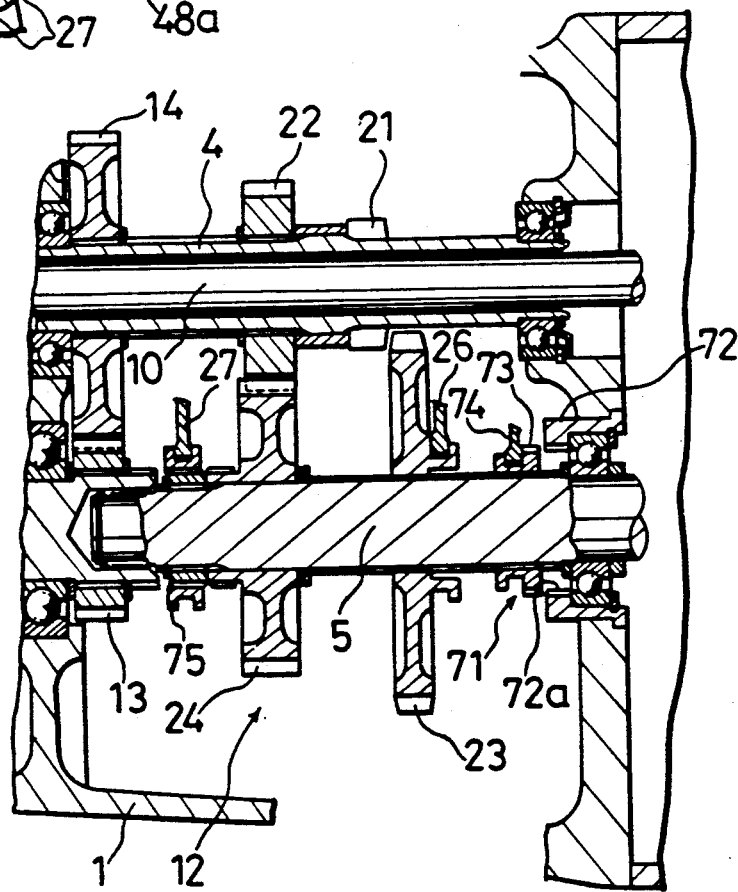
FIG. 10 is a sectional side view of a part of a tractor in which the second embodiment is employed.

When the parking brake (28; 71) (FIGS. 1 and 4; FIG. 10) is to be actuated, the control shaft (36; 79) is firstly given by an operator and using the change lever (35) the first movement, set forth above, so as to displace the operating member (46; 46A; 81) to its operative position where the actuating member (48; 74) is engaged with the control shaft through the operating member. Then, the control shaft (36; 79) is given, using the change lever, the second movement so as to move the actuating member (48; 74). In this case, the shifter forks (26, 27) which are now released from engagement with the control shaft are kept unmoved and only the actuating member (48; 79) is moved so as to actuate the parking brake (28; 71).

When the gear-shifting mechanism is fashioned, as shown respectively in FIGS. 1 and 2 and in FIG. 6, such that its control shaft (36) is firstly given a sliding movement for gear-selecting purpose and, then, is given a rotational movement for gear-shifting purpose, the brake-actuating member (48) may be disposed on the control shaft (36) using this shaft as a support of the actuating member. In a preferred embodiment of the present invention, the brake-actuating member (48) is thus disposed on the control shaft (36) such that the control shaft is slidable and rotatable relative to the actuating member and such that, when said sliding movement is given to the control shaft (36) so as to displace the shafter pin (39) and to thereby release the shifter forks (36, 27) from engagement with the control shaft, the brake-operating member (46; 46A) is slidingly displaced to said operative position where the actuating member (48) is engaged non-rotatably with the control shaft (36) through the operating member (46; 46A) so as to be moved by the rotational movement of the control shaft.

In this case, the brake-operating member may be comprised, as shown in FIGS. 1 and 2, of a pin (46) for connecting the control shaft (36) to the change lever (35) in a direction for causing the sliding movement of control shaft.

When the gear-shifting mechanism is fashioned, as shown in FIGS. 7 and 8, such that its control shaft (79) is firstly given a rotational movement for gear-selecting purpose and, then, is given a sliding movement for gear-shifting purpose, the brake-actuating member (74) may preferably be fashioned so that it is movable along a direction parallel to the control shaft for brake-actuating purpose. In another preferred embodiment, the brake-actuating member (74) is thus supported slidably along a direction parallel to the control shaft (79) such that, when the control shaft carrying a plural number of the shifter pins (77, 78) is rotationally moved so as to displace the shifter pins and to thereby release the shifter forks (26, 27) from engagement with the control shaft (79), the brake-operating member (81) is rotationally displaced to its operative position where the actuating member (74) is engaged non-slidably with the control shaft through the operating member (81). The actuating member (74) is slidingly moved at the operative position of the operating member (81) by the sliding movement of control shaft (79) so as to actuate the parking brake (71).

In this case, it is preferred that the brake-actuating member (74) is slidably mounted, as shown in FIG. 7, on a support shaft (76) on which the shifter forks (26, 27) are slidably mounted.

The brake-actuating mechanism according to the present invention is simple in structure because the change lever (35) and control shaft (36; 79) are commonly used for the gear-shifting mechanism and for the brake-actuating mechanism. A vehicle parking brake should be actuated in a condition where a gear-shifting transmission is in its neutral condition. The parking brake (28; 71) which is operated using a change lever (35) is necessarily actuated at the neutral condition of a gear-shifting transmission which is operated using the same lever.

Because the control shaft (36; 79) is rotationally or slidingly moved for brake-actuating purpose in a condition where engagement of the shifter forks (26, 27) with the control shaft though the shifter pin (39) or pins (77, 78) is released, the brake-actuating mechanism according to the present invention will not cause any trouble in the gear-shifting operation.

DESCRIPTION OF PREFERRED EMBODIMENTS

Figure 5:
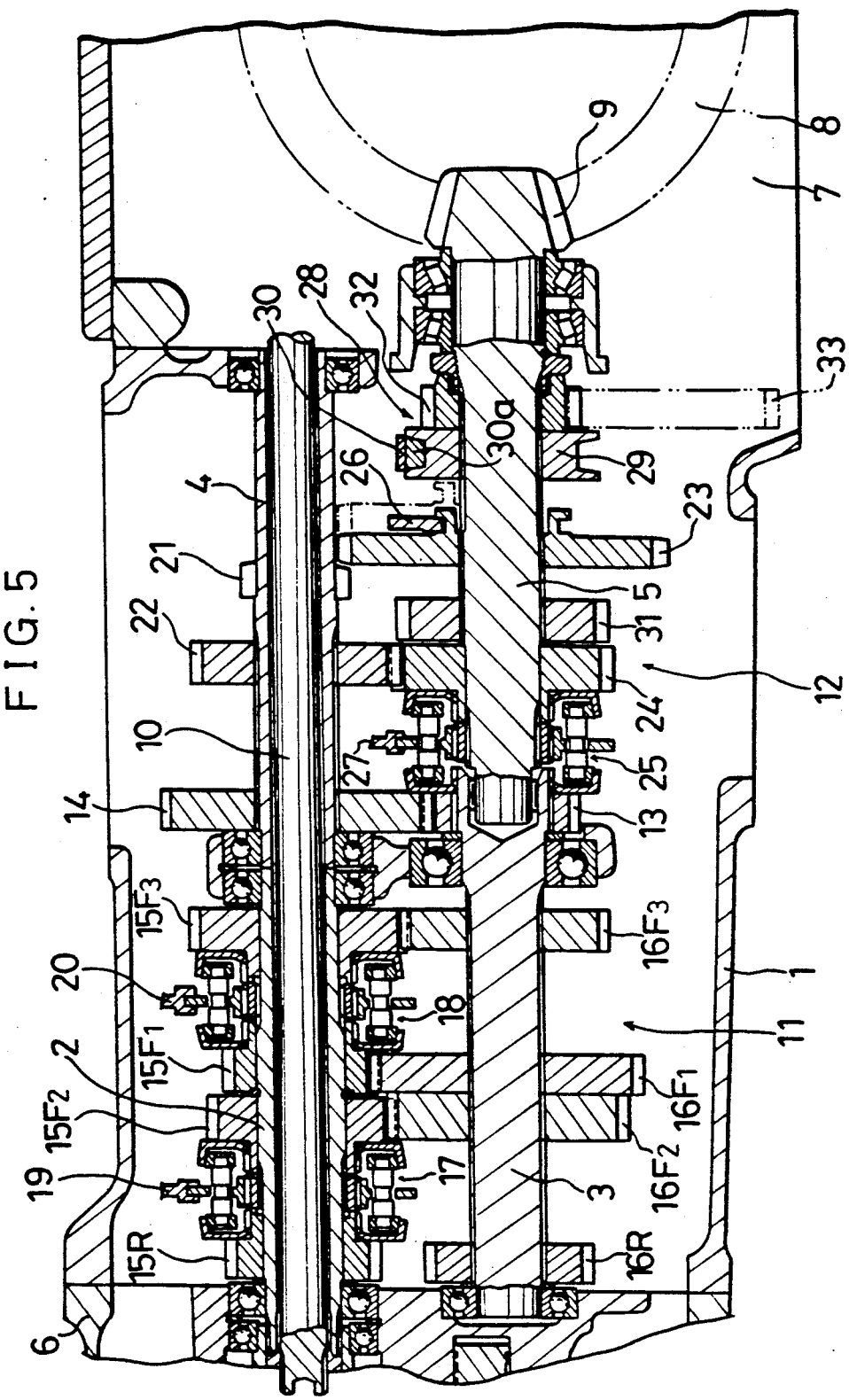
FIG. 5 is a sectional side view of a part of the tractor.

In FIGS. 1 to 4, there is shown a first embodiment of the brake-actuating mechanism according to the present invention which is employed in a tractor comprising a transmission shown in FIG. 5.

As shown in FIG. 5, there are journalled in a transmission casing 1, forming a part of the tractor body, a hollow drive shaft 2 extending axially of the tractor, a speed change shaft 3 disposed at a level lower than that of the drive shaft and extending axially of the tractor, a hollow lay shaft 4 disposed rearwardly of and co-axially with the drive shaft, and a propeller shaft 5 disposed rearwardly of and co-axially with the change shaft. The drive shaft 2 is supplied with driving power from the inside of a front housing which is disposed forwardly of the transmission casing 1. The propeller shaft 5 extends at its rear end portion into a rear housing 7, which is disposed rearwardly of the transmission casing 1, and has at its rear end an integral bevel pinion 9 which meshes with an input bevel gear 8 of a differential gearing (not shown) disposed within the rear housing. A transmission shaft 10 for transmitting power to a power take-off shaft (not shown) extends through the hollow drive and lay shafts 2 and 4.

A main speed change transmission 11 is disposed between the drive shaft 2 and change shaft 3, whereas an auxiliary speed change transmission 12 is disposed between the lay shaft 4 and propeller shaft 5. The change shaft 3 is connected to the lay shaft 4 through a reduction gearing composed of a gear 13, which is fixedly mounted on a rear end portion of the change shaft, and another gear 14 which is fixedly mounted on a front end portion of the lay shaft.

The main speed change mechanism 11 is fashioned to provide three forward direction change ratios and one backward direction change ratio. Four gears $15F_1$, $15F_2$, $15F_3$ and $15R$ are rotatably mounted on the drive shaft 2, and four gears $16F_1$, $16F_2$, $16F_3$ and $16R$ are fixedly mounted on the change shaft 3. Of these gears, gears $15F_1$, $15F_2$ and $15F_3$ are meshed directly with gears 16F$_1$, 16F$_2$ and 16F$_3$, whereas gear 15R is meshed with gear 16R through an idler gear (not shown). A pair of double-acting synchronizer clutch assemblies 17 and 18 are mounted on the drive shaft 2 and are operated selectively by means of two shifter forks 19 and 20 so as to couple gears 15F$_1$, 15F$_2$, 15F$_3$ and 15R to the drive shaft one at a time.

The auxiliary speed change transmission 12 is fashioned to provide four speed change ratios. Two change gears 21 and 22 are fixedly mounted on the lay shaft 4. On the propeller shaft 5, a shiftable gear 23 which may be meshed with gear 21 is slidably but non-rotatably mounted and a gear 24 constantly meshing with gear 22 is rotatably mounted. The shiftable gear 23 may be meshed, at a position shown in phantom in FIG. 5, also with a gear (not shown) which is driven to rotate by the gear 21 through a reduction gearing (not shown). A creeping speed ratio is attained when the shiftable gear 23 is displaced to the position shown in phantom in FIG. 5, whereas a first speed ratio is attainted when the shiftable gear is meshed with gear 21. A double-acting synchronizer clutch assembly 25 is mounted on a front end portion of the propeller shaft 5 and is operable to couple the gear 24 selectively to the propeller shaft so as to attain a second speed ratio of the change transmission 12. The clutch assembly 25 is further fashioned such that it is operable to connect propeller shaft 5 directly to the change shaft 3 so as to attain a third speed-ratio of the speed change transmission 12. The shiftable gear 23 and synchronizer clutch assembly 25 are operated respectively by means of shifter forks 26 and 27.

As also shown in FIG. 5, a parking brake 28 is disposed on the propeller shaft 5 and behind the gear 23. This brake 28 comprises a wheel 29 which is fixedly mounted on the shaft 5. A brake band 30 having a brake shoe 30a which is received in a groove in an outer circumference of the wheel 29 is entrained over the wheel for braking the propeller shaft 5 through the wheel 29 when the tractor is parked.

In FIG. 5, numeral 31 designates a gear which is fixedly mounted on the propeller shaft 5 for taking-off front wheel-driving power from the shaft 5. A further gear 32 is fixedly mounted on the propeller shaft 5 for transmitting rotation of this shaft via a transmission mechanism including a gear 33 to the power take-off shaft, referred to before, for driving it to rotate selectively at a speed proportional to the propeller shaft.

For operating the auxiliary speed change mechanism, there are provided a change lever 35 shown in FIGS. 1 and 2 and a control shaft 36 which is operated selectively to slide and to rotate using the change lever 35. Shifter forks 26 and 27 referred to before are slidably mounted on guide shafts 37 and 38, respectively. A shifter pin 39 slidingly moving the shifter forks 26 and 27 is fixedly attached at its boss portion to the control shaft 36 using a pin 40. The control shaft 36 extends laterally of the tractor and is supported slidably and rotatably by a cover member 41 on the transmission casing and by a cylindrical support member 42 attached to a side of the cover member.

As shown in FIGS. 1 to 3, the control shaft 36 has, at one end portion projecting from the support member 42, a pair of flattened surfaces 36a. A curved support arm 43 is mounted on the control shaft 36 at an outside of the support member 42 and is kept from rotation relative to the shaft 36 by mating it with the flattened surfaces 36a of the control shaft. The change lever 35 has at its lower end an upside-down U-shaped connecting member 44. Free end portion of the support arm 43 projects into the connecting member 44 and is connected to this member using a pin 45 which extends perpendicularly to the control shaft. An outer end portion of the control shaft 36 is sandwiched by a lower end portion of the connecting member 44 and is connected to this member using another pin 46 which extends parallel to the pin 45.

Consequently, when the change lever 35 is rotationally moved about the pin 45 along a direction of arrow A shown in FIG. 1 the control shaft 36 is slidingly moved along its longitudinal axis through the pin 46, whereas, when the change lever 35 is rotationally moved about the pin 46 along a direction of arrow B shown in FIG. 1, the control shaft 36 is rotationally moved about its longitudinal axis through the pin 45 and support arm 43. The change lever 35 is moved along arrow A for gear-selecting purpose selectively to a position shown in FIGS. 1 and 2, where shifter pin 39 on the control shaft 36 is engaged with shifter fork 26, and to a position 35P shown in phantom in FIG. 2 where the shifter pin 39 is engaged with shifter fork 27. The change lever 35 is then moved along arrow B for gear-shifting purpose so as to rotate the control shaft 36 and to thereby displace slidingly one of the shifter forks 26 or 27 with which shifter pin 39 is now engaged. By this, the shiftable gear 23 or a movable clutch member of the clutch assembly 25 shown in FIG. 5 is displaced so as to attain a selected speed ratio of the auxiliary speed change transmission 12.

This gear-shifting mechanism is used also for operating the parking brake 28 shown in FIGS. 1 and 4. As shown in FIGS. 1 to 3, a brake-actuating member 48 which abuts the support arm 43 is mounted on the control shaft 36 and carries an arm 48a. This actuating member 48 has a circular center bore so that the control shaft 36 is slidable and rotatable relative to the actuating member. This member 48 includes in its outer circumference an annular groove 48b in which a free end portion of a retainer 49 attached to the support member 42 is received so as to keep the actuating member 48 and support arm 43 unmoved from their positions shown toward the right, as viewed in FIG. 2.

As shown in FIGS. 1 and 4, the brake band 30 of parking brake 28 is hooked at its one end to a support 50 on an inner bottom of the transmission casing 1 and is entrained over an upper half of the wheel 29. The other end of brake band 28 is hooked to a pin 53 on one end of an arm 52 which is supported rotatably about a pivot 51 extending parallel to the propeller shaft 5. A rotatable brake-actuating shaft 54 extends through a side wall of the transmission casing 1 and carries at its inner end an arm 55 with which the other end of the arm 52 is connected by a vertically extending plate member 56 and by upper and lower pins 57 and 58, which extend perpendicularly to each other, such that when the shaft 54 is rotated toward a direction the arm 52 is rotated so as to tighten the brake band 30 against the wheel 29. Arm 52 is urged to rotate toward a direction of loosening the brake band 30 by a spring 55 which biases the arm 55 on the brake-actuating shaft 54. A sleeve member 60 is fixedly mounted on an outer end portion of the brake-actuating shaft 54 and carries an arm 60a. Arms 48a and 60a on the brake-actuating member 48 and sleeve member 60 are connected with each other by a vertically extending rod 61 such that the brake-actuating shaft 54 is rotationally displaced when the brake-actuating member 48 is displaced rotationally about the axis of control shaft 36.

As shown in FIGS. 1 and 3, the brake-actuating member 48 includes a pair of recesses 62 which are opposite to the pin 46 on the control shaft 36. It is fashioned that, when the change lever 35 is moved along arrow A shown in FIG. 1 to a position 35Q shown in phantom in FIG. 2, control shaft 36 is slidingly moved to a position where the shifter pin 39 on it is disengaged, as shown in phantom in FIG. 2, from both of the shifter forks 26 and 27. It is further fashioned that, at such position 35Q of change lever shown in FIG. 2, pin 46 is displaced to a position 46Q shown in phantom in FIG. 2 where the pin 46 enters, at its both end portions, recesses 62 in the brake-actuating member 48 and engages with this member 48 so as to couple it non-rotatably to the control shaft 36.

In FIG. 2, numerals 63 and 64 designate respectively support shafts on which shifter forks 19 and 20 for the main speed change transmission 11 are slidably mounted, numeral 65 designates a control shaft for the main speed change transmission, and numeral 66 designates a shifter pin which is carried by the control shaft 65 for slidingly displacing the shifter forks 19 and 20. In FIG. 4, numeral 67 designates connecting means for securing brake shoe 30a to the brake and 30.

The change lever 35 is operated to move in accordance with a H-shaped shift pattern, with being guided by a lever guide 68 including a guide groove shown in FIG. 1, to a creeping position C, first speed ratio position I, second speed ratio position II and third speed ratio position III of the auxiliary speed change transmission 12. The guide groove in the lever guide 68 includes a parking position P where the change lever 35 is displaced by moving it firstly into a direction along arrow A fully and then into a direction along arrow B and where the parking brake 28 is actuated at a neutral condition of the auxiliary speed change transmission 12.

In the first embodiment having been detailed hereinbefore, pin 46 for connecting the control shaft 36 to change lever 35 in a direction for causing the sliding movement of control shaft 35 is used as a brake-operating member which is engaged, at its operative position 46Q, with brake-actuating member 48 so as to connect it non-rotatably to the control shaft. In an alternative embodiment shown in FIG. 6, a brake-operating member other than such pin is employed.

As shown in FIG. 6, while the connecting member 44 at the lower end of change lever 35 is connected to the control shaft 36 by a pin 46B which corresponds to the pin 46 shown in FIGS. 1 to 3, a separate operating member or pin 46A is fixedly carried by the control shaft 36. A brake-actuating member 48 is disposed within the transmission casing 1 and is rotatably disposed on the control shaft 36 in a fashion such that the actuating member is kept from sliding movement by a retainer 49 similar to the retainer 49 shown in FIG. 2. The actuating member 48 includes recesses 62 at which the pin 46 engages with actuating member at a condition where the shifter pin 39 is disengaged, as shown in phantom, from shifter forks 26 and 27.

In the modification shown in FIG. 6, a support arm 43 corresponding to the support arm 43 employed in the first embodiment is rotatably mounted on the control shaft 36. Rotational movement of the control shaft 36 by means of change lever 35 is attained through the pin 46B the angular position of which is varied by means of change lever 35.

Figure 9:
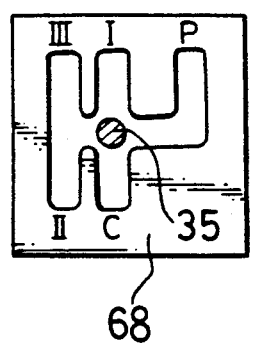
FIG. 9 is a plane view showing a member employed in the second embodiment.

In FIGS. 7 to 9, there is shown a second embodiment which is adapted for actuating a parking brake 71 shown in FIG. 10.

As shown in FIG. 10, brake 71 comprises a hollow cylindrical member 72, having internal teeth 72a and fixedly supported by the rear wall of transmission casing 1, and a slidable member 73 which is slidably but non-rotatably mounted on the propeller shaft 5 and is engageable with the teeth 72a. A fork-shaped actuating member 74 is employed for providing a sliding movement to the member 73 so as to engage it with the teeth 72a of cylindrical member 72 and to thereby attain a locked condition of the propeller shaft 5 by means of the brake 71.

In FIG. 10, an auxiliary speed change transmission 12 is shown which differs from the corresponding speed change transmission 12 shown in FIG. 5 only in that a movable clutch sleeve 75 is provided in place of the synchronizer clutch assembly 25 shown in FIG. 5 for attaining the second and third speed change ratios. The clutch sleeve 75 is operated to slide by means of shifter fork 27.

As shown in FIG. 7, shifter forks 26 and 27 shown in FIG. 10 are slidably mounted on a single support shaft 76 which extends longitudinally of the tractor. A control shaft 79 extending parallel to the support shaft 76 is rotatably and slidably supported by the transmission casing 1 and fixedly carries respective shifter pins 77 and 78 for the shifter forks 26 and 27. Change lever 35 is connected to the control shaft 36 in a like manner as in the first embodiment. In FIG. 7, numeral 46C designates a pin for connecting the control shaft 79 to the connecting member 44, and numeral 80 designates a sleeve for keeping the support arm 43 from sliding. The sleeve 80 includes in its outer circumference an annular groove 80a at which a retainer 49 attached to the transmission casing engages with the sleeve.

As shown in FIG. 8, the shifter pins 77 and 78 are attached to the control shaft 79 at angular positions different from each other. The gear-shifting mechanism shown in FIGS. 7 and 8 is used such that one of the shifter pins 77 and 78 is firstly engaged with the corresponding shifter fork 26 or 27 by rotationally moving the control shaft 79 using change lever 35 and, then, one of the shifter forks 26 and 27 is slidingly displaced by slidingly moving the control shaft 79 using change lever 35.

A brake-operating member 81 which is shaped as a pin having a mounting boss similarly to each of the shifter pins is fixedly carried by the control shaft 79 at an angular position different from those of the shifter pins 77 and 78, as shown in FIG. 8. As shown in FIG. 7, the brake-actuating member 74 is slidably mounted on the support shaft 76 for the shifter forks 26 and 27 and includes in its upper surface a recess at which the operating member or pin 81 is engageable with the actuating member. It is fashioned that the control shaft 71 may be rotationally moved by means of change lever 35 to an angular position where the operating member 81 is engaged with the actuating member 74 so as to connect the actuating member non-slidably to the control shaft. At such angular position, the control shaft 71 is slidingly moved using the change lever 35 so as to slidingly displace the actuating member 74 rearwards and to thereby actuate the parking brake 71 shown in FIG. 10.

A lever guide 68 shown in FIG. 9 is provided also in this second embodiment. The change lever 35 may be retained at parking position P of a guide groove in the lever guide 68.

I claim:

1. In a vehicle which includes a gear-shifting mechanism and a parking brake, said gear-shifting mechanism comprising a control shaft which is mounted for sliding movement along its longitudinal axis and for rotational movement about said axis, a change lever which is operable to provide one of said sliding and rotational movements selectively to said control shaft, and shifter forks each of which is supported slidably for gear-shifting operation, said control shaft fixedly carrying a shifter pin through which one of said shifter forks is engaged selectively with the control shaft by a sliding movement of said control shaft and through which each of said shifter forks is slidingly displaced by a rotational movement of said control shaft at an engaged condition of said each shifter fork with the control shaft, a brake-actuating mechanism which comprises:

- a brake-operating member (46; 46A) fixedly carried by said control shaft (36) and having an operative position to which said operating member is displaced selectively by a sliding movement of said control shaft, said operating member being disposed relative to said shifter pin (39) such that said shifter forks (26, 27) are released from engagement with said control shaft at said operative position of the operating member; and
- a rotatable brake-actuating member (48) mounted on said control shaft (36) such that the control shaft is slidable and rotatable relative to said actuating member, said actuating member being disposed such that the said member is engaged non-rotatably with said control shaft through said operating member (46; 46A) at said operative position of said operating member so as to be rotationally moved by a rotational movement of said control shaft and to thereby actuate said parking brake (28).

2. A brake-actuating mechanism as set forth in claim 1, wherein said brake-operating member is comprised of a pin (46) for connecting said control shaft (36) to said change lever (35) in a direction for causing said sliding movement of the control shaft.

3. In a vehicle which includes a gear-shifting mechanism and a parking brake, said gear-shifting mechanism comprising a control shaft which is mounted for sliding movement along its longitudinal axis and for rotational movement about said axis, a change lever which is operable to provide one of said sliding and rotational movements selectively to said control shaft, and shifter forks each of which is supported slidably for gear-shifting operation, said control shaft fixedly carrying shifter pins through which said shifter forks are engaged one at a time selectively with the control shaft and through which each of said shifter forks is slidingly displaced by a sliding movement of said control shaft at an engaged condition of said each sifter fork with the control shaft, a brake-actuating mechanism which comprises;

- a brake-operating member (81) fixedly carried by said control shaft (79) and having an operative position to which said operating member is displaced selectively by a rotational movement of the control shaft, said operation member being disposed relative to said shifter pins (77, 78) such that said shifter forks (26, 27) are released from engagement with said control shaft at said operative position of the operating member; and
- a brake-actuating member (74) slidably mounted on a support shaft (76) which extends parallel with said control shaft (79) and on which said shifter forks (26, 27) are slidably mounted, said actuating member being disposed such that the said member is engaged non-slidably with said control shaft through said operating member (81) at said operative position of said operating member so as to be slidingly moved by a sliding movement of said control shaft and to thereby actuate said parking brake (71).

* * * * *